United States Patent Office 2,986,536
Patented May 30, 1961

2,986,536
PROCESS FOR COLORING POLYURETHANE FOAMS

Norman L. Anderson, Hamburg, and Charles E. McGinn, Kenmore, N.Y., assignors to Allied Chemical Corporation, a corporation of New York No Drawing. Filed Dec. 7, 1956, Ser. No. 626,814

5 Claims. (Cl. 260—2.5)

This invention relates to processes for coloring polyurethane foams with synthetic organic pigments.

In the specification and claims all percentages and parts are given on a weight basis.

It has been proposed to color polyurethane foams by incorporating dried, ground pigments into one or more of the reactants or reactant compositions which are combined to initiate the formation of the foam. Colorations prepared by this method are usually of poor color strength and non-uniform.

Water-containing filter cakes of precipitated pigments are not used to color higher polymers and plastics because the water introduced vaporizes and causes "blistering" during curing. It is chiefly for this reason that prior to this invention dried, ground pigments were used for coloring polyurethane foams notwithstanding that the drying and grinding of the pigment has certain disadvantages, among which may be mentioned (1) the costly and troublesome operation of drying and grinding the pigment; (2) the difficulty inherent in dispersing dry pigment in the foam-forming reactants and reactant compositions; and (3) the agglomeration, hardening and loss of dispersibility of the pigment particles which result from the drying.

In accordance with this invention, synthetic organic pigments precipitated from aqueous media in the form of water-containing filter cakes having from 10% to 90% of water are employed to color polyurethane foams in which the carbon dioxide required to expand the polyurethane foam results at least in part from the reaction between water and isocyanate groups by incorporating such pigment filter cakes into a foam-forming reactant other than the isocyanate, of such polyurethane foam which is then combined with other reactants to form the foam or by incorporating such pigment filter cake into the foam-forming reactant compositions forming such foams. Where the water content of the pigment filter cakes is inadequate to supply all of the water needed for the reaction with isocyanate groups to produce the carbon dioxide required for expanding the polyurethane foam, the required amount of additional water for this purpose is added to the reactants.

Formation of polyurethane foams involves reaction between a polyfunctional organic isocyanate and a high molecular weight polyol which may contain terminal carboxyl groups in addition to the terminal hydroxyl groups. Chain-extending urethane linkages are formed by reaction between isocyanate groups and hydroxyl groups. Chain-extending amide linkages may be formed by reaction between isocyanate groups and carboxyl groups with simultaneous in situ evolution of carbon dioxide gas. Chain-extending urea linkages may also be formed by reaction between two isocyanate groups and one molecule of water with simultaneous in situ evolution of carbon dioxide gas. The carbon dioxide gas evolved by reaction between isocyanate groups and water and/or carboxyl groups expands to form the cell structure of the foam.

The present invention is applicable to the coloration of all such polyurethane foams in which a reaction takes place between water and isocyanate groups to evolve carbon dioxide which expands to form the cell structure of the foam. The invention may be used to color foams made by various procedures. Thus, it is applicable to the so-called "single shot" method in which the poly-isocyanate is added to a mixture of polyol and pigment filter cake, additional water if necessary, and which mixture may also contain a catalyst and an emulsifier. The invention may also be employed in the so-called "prepolymer" method in which a polyisocyanate and polyol are first reacted to obtain a "prepolymer" which is thereafter combined with the pigment filter cake, additional water if necessary, and usually a catalyst and emulsifier. The latter method is particularly suitable with polyethers such as polyalkylene glycols. The invention may also be practiced in continuous foam producing machines wherein separate streams of the polyol, polyisocyanate, catalyst, pigment filter cake, additional water if necessary, and emulsifier, or suitable mixtures thereof, as noted above, are simultaneously injected into a mixing chamber which discharges into a mold. Standardized pastes or mixtures containing the pigment filter cake, additional water if necessary, and emulsifier or these together with the catalyst may be prepared and used advantageously.

Water-containing filter cakes of synthetic organic pigments suitable for coloring polyurethane foams in accordance with this invention may be produced by any of the known procedures for making such filter cakes. Thus, for example, azo pigments are precipitated from aqueous media subsequent to the coupling reaction and filtered to produce the pigment filter cakes. Pigmentary forms of vat dyes are obtained as water-containing filter cakes after acid-pasting or vatting operations. Other synthetic pigments, such as copper phthalocyanine are obtained as water-containing filter cakes after acid pasting. So-called "lake" pigments are precipitated as water-containing filter cakes after addition of an inorganic precipitate-forming reactant to an aqueous medium containing suitable reactive colored compounds. In all these filter cakes, the pigment is in a form of high dispersion and particle subdivision, which properties are lost if the filter cakes are dried.

The particular pigment filter cakes used will of course depend on the desired color, light fastness, wash fastness, resistance to dry cleaning solvents, etc. As these properties of the pigment are well known or can readily be determined, these factors introduce no difficulty in selecting pigments for coloring polyurethane foams, depending upon the intended use of the foams. The foams produced by this invention may be used to make sponges, cushions, mats, toys, garment linings and decorative objects. The pigment chosen will depend, as noted above, in part at least on the intended use of the colored polyurethane foam. Some pigments, such as the coupling product of diazotized 2 aminoanisole-4-carboxylic acid anilide and beta oxy naphthoic anilide have a catalytic effect on the foam forming reaction; when such pigments are used the amount of catalyst used should be reduced proportionately. Thus, in the case of the above-mentioned coupling product, only about 50% of the usual amount of catalyst need be employed.

As a general rule, filter cakes obtained in the manufacture of synthetic organic pigments contain from 10% to 30% of pigment and from 90% to 70% water. If desired, water can be evaporated until the filter cake contains 90% of pigment without substantial irreversible agglomeration or loss of dispersibility of pigment particles. Thus, this invention involves the use of organic pigment filter cakes containing from 10% to 90% of water, preferably from 70% to 90% of water and from 10% to 90% of pigment, preferably, 10% to 30% of pigment.

The amount of pigment required to color a polyurethane foam will of course vary with the depth of coloration desired. Pigment concentrations are advantageously calculated as weight percent of pigment dry basis on the amount of polyol in the formulation. In general, from 0.03% to 0.08% of pigment concentrations calculated on this basis give light colorings such as flesh tints; from 0.08% to 0.2% give pastel and medium depth colorations; and from 0.2% to 0.3% give deep colorations. No improvement in coloration or color strength usually occurs when using more than 0.3%. Hence, in practicing this invention, from 0.03% to 0.3% of pigment, dry basis, based on the weight of polyol may be used; larger amounts can be used but usually do not result in any substantial improvement in color.

The physical and chemical properties of the polyurethane foams may be varied, as is well known, by varying the formulation, processing procedure and reaction conditions. Polyisocyanates suitable for making foams include, among many others, tetramethylene diisocyanate, hexamethylene diisocyanate, m-phenylene diisocyanate, 2,4- and 2,6-tolylene diisocyanates, 3,3'-bitolylene-4,4'-diisocyanate, methylene di-p-phenyleneisocyanate, 1,5-naphthalene diisocyanate, and a triisocyanate prepared by reacting 3 mols of tolylene diisocyanate with one mol of hexanetriol.

Polyols suitable for making foams include (1) trihydric alcohols such as castor oil, (2) polyalkylene ether glycols prepared from ethylene, propylene or tetramethylene glycols, including polybutylene glycol of molecular weight 3000, derived from 1,4-butylene glycol, known commercially as Teracol 30, and (3) polyesters which are the reaction products of dihydric alcohols and dicarboxylic acids, for example, polyesters prepared by copolymerizing a dicarboxylic acid, such as adipic, phthalic, sebacic, succinic, or oxalic acid with a glycol or polyalkylene glyol, such as ethylene, diethylene, propylene and butylene glycols or obtained by copolymerizing ethylene glycol or glycerin with a mixture of phthalic and adipic acids; the last mentioned polyesters are alkyd resins.

In the production of flexible foams from about 25 to 50 parts of diisocyanate are mixed per 100 parts of the polyol. For rigid foams from about 60 to 225 parts of diisocyanate are employed per 100 parts of the polyol. In general, the lighter foams require more diisocyanate than the denser foams. It will be understood that the invention is not limited to these proportions of reactants.

Catalysts and emulsifiers are generally used to prepare low density flexible foams from polyester diols but are used less often to prepare foams from polyether diols and alkyd resins. Preferred catalysts are the basic tertiary amine catalysts, such as N,N-diethylethanolamine, N-methyl morpholine, N,N-dimethylcyclohexylamine, and N-ethyl morpholine. The usual amount of the catalyst may be employed; in general up to 5% of catalyst based on the polyol will give satisfactory results.

Preferred emulsifiers are of the nonionic type, such as a monoether of a polyethylene glycol with an alkyl phenol, blends of poly alcohol carboxylic acid esters and oil soluble sulfonates (Witco 77), polyethylene glycol ricinoleate (Emulphor EL-719), sorbitan monolaurate (Span 20), and poly oxy alkylene derivatives of sorbitan monolaurate (e.g. Tween 20 and Tween 80). Anionic emulsifiers such as sodium dioctyl sulfosuccinate may also be used. In general the amount of emulsifier required does not exceed 10% based on the polyol.

The foam formulation may, as conventional, contain other constituents, such as fillers, foam stabilizers, e.g. reaction products of amines, metallic soaps, leafing powders, etc.

The amount of water present, including that introduced by the pigment filter cake should be enough to react with the isocyanate to liberate sufficient gas to produce a foam of desired physical characteristics, e.g. density. The more water used, in general, the lower the density of the foam. From 0.5 to 10% of water based on the weight of isocyanate will generally give good results.

The temperature of mixing the constituents and curing are those commonly used in the formation of polyurethane foams. The mixing of the constituents may be carried out under atmospheric conditions. The curing temperature will of course depend on the particular formulation. Typical curing conditions are given in the examples which follow.

The following examples illustrate use of the invention to color low density flexible polyurethane foams prepared from m-tolylene diisocyanates and a polyester diol. It will be understood this invention is not limited to these examples.

*Example 1.—Coloration of polyurethane foam made by the "single shot" procedure*

The pigment used in this example was prepared by diazotizing 2-chlor-4-amino-5-sulfo toluene, coupling the diazo compound into beta oxy naphthoic acid, isolating the coupling product as a filter cake, reslurrying the filter cake, heating the slurry to 90° C., adding calcium chloride to precipitate a calcium salt or "lake" of the coupling product, isolating the precipitated pigment by filtration, and washing the filter cake with water until it was substantially free of soluble matter. The filter cake contained about 20% of red pigment and 80% of water.

The polyester diol used in this example was a diethylene glycol adipate having approximately the following characteristics: acid No., 2; hydroxyl No., 62. average molecular weight, 1750.

The emulsifier used was "Triton X-100," a monoether of a polyethylene glycol and an alkyl phenol.

A mixture of the following compounds was prepared:

| | |
|---|---|
| Diethylene glycol adipate _____ g__ | 200.0 |
| Water added as such _____ g__ | 6.2 |
| Water in 1 g. of filter cake _____ g__ | 0.8 |
| Total water _____ g__ | 7.0 |
| Pigment in 1 g. of filter cake _____ g__ | 0.2 |
| "Triton X-100" emulsifier _____ g__ | 6.8 |
| N-ethyl morpholine (catalyst) _____ ml__ | 2.4 |

The batch was agitated in a propeller type mixer for 10 minutes to ensure uniform dispersion of the pigment in the other components. The temperature of the mixture was adjusted to 20° C. The batch was then charged with 62 g. of a mixture of m-tolylene diisocyanates (80% 2,4 isomer and 20% 2,6 isomer) and agitated rapidly for 10 seconds. It was then poured into a mold, allowed to stand at room temperature for 16 hours and cured by heating for 2 hours at 70° C.

The resultant foam was uniformly colored a bright bluish red shade of excellent color strength.

*Example 2.—Coloration of polyurethane foam made by the "prepolymer procedure"*

The polyester, diisocyanate, catalyst and emulsifier used in this example were the same as those used in Example 1.

The pigment was prepared by tetrazotizing one mol of o-dianisidine and coupling with two mols of acetoacet-1,2,4 xylidide by a procedure similar to that described on pages 156-7 of BIOS Report 961. The coupling product was recovered as a filter cake containing about 25% of orange pigment and 75% of water.

A "prepolymer" was prepared by mixing 100 g. of the diethylene glycol adipate with 39 g. of the mixture of m-tolylene diisocyanates for about 30 minutes at room temperature.

A "catalyst mix" of the following composition was separately prepared:

| | G. |
|---|---|
| Water added as such | 2.2 |
| Water in 0.4 g. of filter cake | 0.3 |
| Total water | 2.5 |
| Pigment in 0.4 g. of filter cake | 0.1 |
| N-methyl morpholine (catalyst) | 0.7 |
| "Triton X-100" (emulsifier) | 3.4 |

The amount of catalyst used in the above formulation was 50% of that ordinarily used because the pigment itself has a catalytic effect on the foam-forming reaction.

The "catalyst mix" was added to the "prepolymer" and the resulting mixture agitated for 10 seconds and poured into a mold. The mold was allowed to stand for 20 minutes to permit the mixture to set and was then cured in an oven at 100°–120° C. for 2 hours.

The resulting product was a low-density flexible foam uniformly colored a pastel orange hue.

Examples 3 and 3a

These examples involve substantial duplication of Examples 1 and 2, respectively, except that instead of the pigment filter cakes used in Examples 1 and 2, respectively, a pigment filter cake of acid pasted copper phthalocyanine containing 12% pigment and 88% water and having a blue color was employed.

Examples 4 and 4a

These examples involve substantial duplication of Examples 1 and 2, respectively, except instead of the pigment filter cakes used in Examples 1 and 2, respectively, a pigment filter cake of acid pasted hexadecachlor copper phthalocyanine containing 18% pigment and 82% water, and having a green color, was employed.

Examples 5 and 5a

These examples involve substantial duplication of Examples 1 and 2, respectively, except that instead of the pigment filter cakes used in Examples 1 and 2, respectively, a pigment filter cake of acid pasted carbazolized 4:5′ dibenzoylamino 1:1′ dianthrimide, containing 18% pigment and 82% water, and having a brown color, was employed.

Examples 6 and 6a

These examples involve substantial duplication of Examples 1 and 2, respectively, except that instead of the pigment filter cakes used in Examples 1 and 2, respectively, the product of oxidizing aniline with potassium dichromate in sulfuric acid medium containing copper sulfate containing 27% pigment and 73% water, and having a black color, was employed.

Examples 7 and 7a

These examples involve substantial duplication of Examples 1 and 2, respectively, except that instead of the pigment filter cakes used in Examples 1 and 2, respectively, acid pasted di-p-anisoyl-imide of perylene tetra carboxylic acid, containing 13% pigment and 87% water, and having a scarlet color, was employed.

Examples 8 and 8a

These examples involve substantial duplication of Examples 1 and 2, respectively, except that instead of the pigment filter cakes used in Examples 1 and 2, respectively, the coupling product of diazotized 2 aminoanisole-4-carboxylic acid anilide and beta oxy naphthoic acid anilide, containing 26% pigment and 74% water, and having a deep red color, was used.

Examples 9 and 9a

These examples involve substantial duplication of Examples 1 and 2, respectively, except that instead of the pigment filter cakes used in Examples 1 and 2, respectively, the coupling product of tetrazotized 3,3′-dichlorobenzidine and 2 equivalents of 1-phenyl-3-methyl-5-pyrazolone, having 27% pigment and 73% water, and having an orange color, was used.

Examples 10 and 10a

These examples involve substantial duplication of Examples 1 and 2, respectively, except that instead of the pigment filter cakes used in Examples 1 and 2, respectively, the coupling product of tetrazotized dichloro dianisidine with two mols of acetoacet-1,2,4-xylidide, containing 22% pigment and 78% water, and having a bright greenish yellow color, was used.

Examples 11 and 11a

These examples involve substantial duplication of Examples 1 and 2, respectively, except that instead of the pigment filter cakes used in Examples 1 and 2, respectively, the coupling product of tetrazotized o-dianisidine with two mols of 2,3 oxynaphthoic acid anilide, containing 28% pigment and 72% water, and having a blue color, was used.

Examples 12 and 12a

These examples involve substantial duplication of Examples 1 and 2, respectively, except that instead of the pigment filter cakes used in Examples 1 and 2, respectively, the coupling product of tetrazotized 3,3′-dichlorobenzidine with 2 mols of 1-phenyl-3-carbethoxy-5-pyrazolone, containing 24% pigment and 76% water, and having a red color, was used.

Examples 13 and 13a

These examples involve substantial duplication of Examples 1 and 2, respectively, except that instead of the pigment filter cakes used in Examples 1 and 2, respectively, the coupling product of tetrazotized 3,3′-dichlorobenzidine with 2 mols of acetoacet-1,2,4-xylidide, containing 25% pigment and 75% water, and having a yellow color, was used.

The following examples illustrate use of the invention to color foams prepared from other reactants than those involved in Examples 1 to 13a inclusive.

Example 14.—Rigid foam

The polyol used in this example was an alkyd resin, obtained by reaction of tetrachlorophthalic acid (0.5 mol), glycerine (3.8 mols), and adipic acid (2.5 mols) and had a hydroxyl number of 450 and an acid number of 42. 600 g. of the alkyd resin and 560 g. of a mixture of tolylene diisocyanates (80% 2,4-isomer and 20% 2,6-isomer) were mixed at 25° C. for 15 minutes. Then 6 g. of the filter cake of dye used in Example 1 (containing 1.2 g. dye and 4.8 g. water) and 1.2 g. of water were added and the mixture was agitated for 15-20 minutes at room temperature. 64 ml. of a 10% solution of sodium dioctyl sulfosuccinate (emulsifier) in dry acetone were added, and the mixture was stirred well for 3 minutes, poured into a mold, and the foam was cured by heating to 50° C. for 5 hours.

The foam thus obtained was uniformly colored a deep bluish red shade. It was a rigid foam possessing a density of approximately 2½ lbs./cu. ft.

Example 15.—Foam prepared from 1,5-naphthalene diisocyanate and diethyleneglycoladipate polyester A mixture of 100 g. of a "prepolymer" obtained by mixing 68 g. of diethyleneglycol adipate polyester (acid number 2, hydroxyl number 62, average molecular weight 1750) and 32 g. 1,5-naphthalenediisocyanate at room temperature for about ½ hour, 1.7 g. N-methylmorpholine, 1.7 g. "Triton X-100," 0.4 g. of color filter cake used in Example 8 containing 0.1 g. pigment and 0.3 g. water, and 1.4 g. of water was heated rapidly to 60° C. with agitation and poured into a mold. The foam was allowed to cure for about 16 hours at room temperature.

The product thus obtained was a flexible foam uniformly colored a bright red shade.

*Example 16.—Foam prepared from a polyether*

100 g. of polypropyleneglycol, having a hydroxyl number of 83 and an acid number of 1.7 and derived from 1,2-propyleneglycol, were reacted with 51 g. of 2,4-tolylenediisocyanate at 150° C. for one hour to produce an adduct.

100 g. of the adduct thus obtained were added to a mixture of 13.3 g. of polypropyleneglycol produced as described above, 0.8 g. of N,N-dimethylcyclohexylamine, 0.4 g. of color filter cake used in Example 13 containing 0.1 g. pigment and 0.3 g. water, and 1.94 g. of water. The resulting mixture was agitated for about 1 minute and poured into a mold, and the foam was cured by heating to 90° C. for about 5 hours.

The product thus obtained was a flexible foam of density 2.8 lbs./cu. ft. uniformly colored a medium yellow shade.

In all of the above examples the foams produced were uniformly colored and of excellent color strength.

It will be noted the present invention provides a novel process of coloring polyurethane foams, in which the carbon dioxide required to expand the polyurethane foam results from the reaction between water and isocyanate groups with organic pigments producing attractive, uniform colorations of excellent color strength and pigment dispersion. In that this invention involves the use of the water-containing filter cakes, it eliminates the costly and troublesome operations of drying and grinding the pigment to produce dried, ground pigments heretofore used and results in ready dispersion of the pigment uniformly in the foam forming reactant or reactant composition because the water-containing pigment filter cake is more readily and uniformly dispersed in the reactant or reactant composition than are dried, ground pigments. Moreover, the present invention eliminates the agglomeration, hardening and loss of dispersibility of the pigment particles which result from drying. These adverse effects of drying the pigment cannot generally be completely reversed in practice even by prolonged milling of dry pigment into foam forming reactants. As a result, colorations obtained by use of dry pigment are markedly inferior in uniformity, color strength and dispersion as compared with colored polyurethane foams obtained by the process of this invention.

The expression "a reaction mixture of polyol and polyisocyanate" in the specification and claims includes a reaction mixture in which the polyol and polyisocyanate are present as such or as a reaction product thereof, e.g. a "prepolymer" as noted above, which may contain no free polyol but is capable of further reacting with water to form a polyurethane foam, as is well known.

It is understood this invention is not restricted to the present disclosure otherwise than as defined by the appended claims. The express procedure and materials set forth above are given only by way of illustration and to aid in clarifying the invention.

We claim:
1. The process of coloring a polyurethane foam in which the carbon dioxide required for forming the foam is formed by reaction of water with isocyanate groups, which process comprises dispersing a water-containing organic pigment filter cake containing from 10% to 90% by weight of water and from 90% to 10% by weight of organic pigment, said organic pigment being selected from the group consisting of azo pigments, vat dyes, copper phthalocyanine and lake pigments, uniformly throughout a reaction mixture containing an organic polyisocyanate and a polyol from the group consisting of trihydric alcohols, polyalkylene ether glycols and polyesters which are the reaction products of an alcohol from the group consisting of dihydric alcohols and glycerol and dicarboxylic acids to produce a reaction mixture containing said pigment, water in amount sufficient to produce a foam of desired density and from about 25 to about 225 parts of said polyisocyanate per 100 parts of said polyol, introducing said mixture into a mold and curing said mixture to produce the colored polyurethane foam of desired density.

2. The process as defined in claim 1, in which the polyol and polyisocyanate are present in the reaction mixture in the proportions of from about 25 to 50 parts of polyisocyanate per 100 parts of the polyol.

3. The process as defined in claim 1, in which the polyol and polyisocyanate are present in the reaction mixture in the proportions of from about 60 to 225 parts of polyisocyanate per 100 parts of the polyol.

4. The process as defined in claim 1, in which the water-containing organic pigment is mixed with the said polyol and the resultant mixture then mixed with the organic polyisocyanate.

5. The process as defined in claim 1, in which the polyisocyanate is from the group consisting of tetramethylene diisocyanate, hexamethylene diisocyanate, m-phenylene diisocyanate, tolylene diisocyanates, 3,3′ bitolylene-4,4′-diisocyanate, methylene di-p-phenyleneisocyanate, 1,5-naphthalene diisocyanate, and a triisocyanate prepared by reacting 3 mols of tolylene diisocyanate with one mol of hexanetriol.

References Cited in the file of this patent

UNITED STATES PATENTS

| | | |
|---|---|---|
| 2,192,954 | Sloan et al. | Mar. 12, 1940 |
| 2,282,527 | Morrison et al. | May 12, 1942 |
| 2,740,743 | Pace | Apr. 3, 1956 |
| 2,811,493 | Simon et al. | Oct. 29, 1957 |
| 2,855,021 | Hoppe | Oct. 7, 1958 |
| 2,885,268 | Breer et al. | May 5, 1959 |

FOREIGN PATENTS

| | | |
|---|---|---|
| 716,422 | Great Britain | Oct. 6, 1954 |
| 164,975 | Australia | Sept. 5, 1955 |